US006855635B2

(12) United States Patent
Schumacher et al.

(10) Patent No.: US 6,855,635 B2
(45) Date of Patent: Feb. 15, 2005

(54) COATED DOPED OXIDES

(75) Inventors: Kai Schumacher, Wiesbaden (DE); Helmut Mangold, Rodenbach (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/101,942

(22) Filed: Mar. 21, 2002

(65) Prior Publication Data

US 2002/0177311 A1 Nov. 28, 2002

(30) Foreign Application Priority Data

Mar. 24, 2001 (EP) ............................................. 01107334

(51) Int. Cl.[7] .......................................... H01L 21/302
(52) U.S. Cl. ..................................................... 438/692
(58) Field of Search .......................... 438/692; 427/74, 427/76, 191, 216

(56) References Cited

U.S. PATENT DOCUMENTS

| 4,832,711 | A | | 5/1989 | Christel, Jr. et al. | |
|---|---|---|---|---|---|
| 5,711,897 | A | * | 1/1998 | Havelka et al. | 252/77 |
| 5,833,877 | A | * | 11/1998 | Elliott | 252/299.01 |
| 6,126,855 | A | * | 10/2000 | Elliott | 252/299.01 |
| 6,268,014 | B1 | * | 7/2001 | Eberspacher et al. | 427/74 |
| 6,328,944 | B1 | | 12/2001 | Mangold et al. | |
| 6,358,562 | B1 | * | 3/2002 | Vollath et al. | 427/228 |
| 2002/0107140 | A1 | * | 8/2002 | Hampden-Smith et al. | 502/185 |

FOREIGN PATENT DOCUMENTS

| CA | 2223377 | 6/1998 |
|---|---|---|
| DE | 196 50 500 A1 | 6/1998 |
| EP | 0 088 905 | 9/1983 |
| EP | 0 850 876 | 7/1998 |
| EP | 0 995 718 | 4/2000 |

* cited by examiner

Primary Examiner—John F. Niebling
Assistant Examiner—Olivia Luk
(74) Attorney, Agent, or Firm—Oblon, Spivak, McClelland, Maier & Neustadt, P.C.

(57) ABSTRACT

Oxide particles with a doping component distributed in the core and a shell surrounding the core, which can be prepared by first introducing the doping into the core of a metal oxide or metalloid oxide via an aerosol in a pyrogenic process, subsequently coating the doped core with a salt solution of a metal or metalloid, drying it and optionally calcining it; which particles can be employed for chemical-mechanical polishing.

21 Claims, 4 Drawing Sheets

100 nm 100 nm

COATED DOPED OXIDES

BACKGROUND OF THE INVENTION

1. Field of the Invention

The invention provides oxide particles with a core of a metal oxide or metalloid oxide, a doping component distributed in the core and a shell surrounding the core.

2. Description of the Background

The persistent trend towards miniaturization in the semiconductor industry leads to ever higher requirements in the chemical-mechanical polishing of oxide and metal layers. The aim of polishing is a rapid, precise removal of the surface without generating scratches, with the highest possible selectivity of the polishing agent towards the various layers required for building up an integrated circuit.

Attempts are made to meet these higher demands on the polishing agent in part by employing physical mixtures of polishing particles for a polishing task, in order thus to combine the particular advantages of the mixture partners. It is often a disadvantage here that parameters which are important for the polishing operation, such as e.g. the particle sizes or the behaviour of the polishing particles at various pH ranges, do not match one another. This means that no stable dispersions for chemical-mechanical polishing can be obtained.

Although uniform particles are present in chemical mixtures of polishing particles, the combination possibilities are limited by the known preparation processes and the availability of the starting materials and the associated profitability of the processes.

A process for the preparation of mixed oxides is described, for example, in EP-A-1048617. In a pyrogenic process, an $SiCl_4/AlCl_3$ mixture is brought together in an oxygen/hydrogen flame and a mixed oxide of silicon dioxide and aluminum oxide is obtained in a hydrolysis step. Uniform is to be understood as meaning that a mixed oxide particle consists of the two molecular species $SiO_2$ and $Al_2O_3$.

The doped, pyrogenic oxides described in DE-A-196 50 500 extend the range of abrasive particles for chemical-mechanical polishing. The doping component, which is distributed in the entire particle, changes the structure and the properties of the particular particle and therefore the polishing properties, such as rate of removal of material and selectivity. However, the polishing selectivity is not sufficient for uses in chemical-mechanical polishing of very thin layers.

SUMMARY OF THE INVENTION

The object of the invention is therefore to provide mixed oxide particles for chemical-mechanical polishing of semiconductor substrates and of layers applied to them which are tailor-made for the particular polishing purpose, the composition of which can be varied over a wide range in an economically reasonable manner and which avoid the disadvantages of the prior art described.

The invention provides oxide particles with a core, a doping component distributed in the core and a shell surrounding the core, the core, doping and shell being of different chemical composition.

DETAILED DESCRIPTION OF THE INVENTION

Figure 1A:
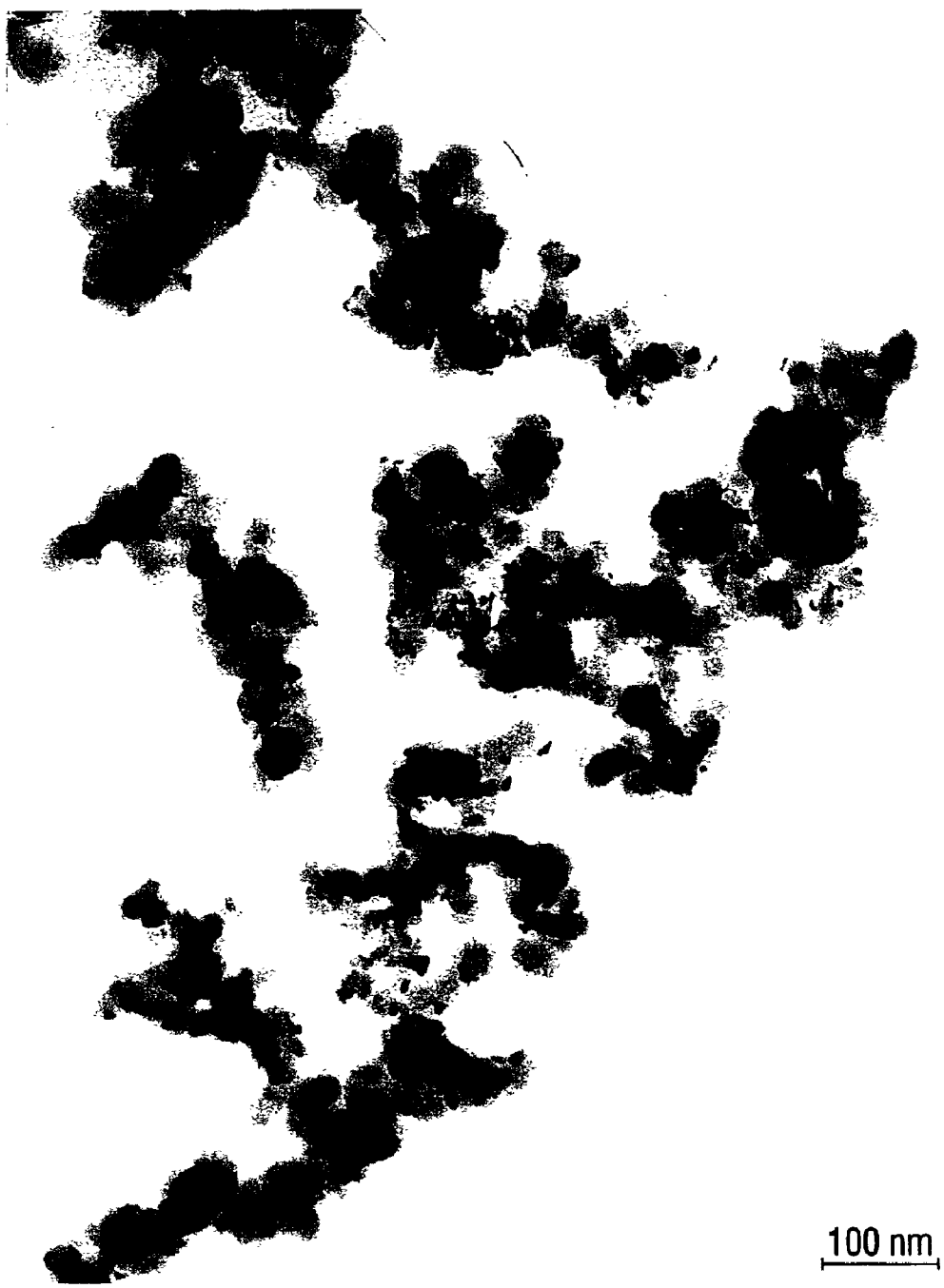
FIGS. 1a and 2a are TEM photographs of examples according to the invention.

The core can comprise a metal oxide or metalloid oxide or a chemical mixture of metal oxides or metalloid oxides or a physical mixture of metal oxides or metalloid oxides. Metal oxides or metalloid oxides which are obtained from a pyrogenic process, from a sol-gel process, a hydrothernal process, a plasma process, an aerogel process, a precipitation process or from a combination of these processes are preferred. These processes are described by the example of silicon dioxide in Ullmanns Encyclopedia of Industrial Chemistry, 5th edition, volume A 23, page 583.

Precipitated metal oxides and metalloid oxides can be obtained by known processes by reaction of metal salts and acids or other precipitating agents. The particles obtained can be filtered, washed and dried.

Pyrogenic metal oxide and/or metalloid oxide particles are particularly preferred according to the invention as the core. They are obtained by hydrolysis of a suitable, vaporizable starting material in a oxygen/hydrogen flame. An example is pyrogenic silicon dioxide from silicon tetrachloride.

The pyrogenic oxides aluminum oxide, titanium oxide, zirconium oxide, silicon dioxide, iron oxide, cerium oxide, tin oxide, zinc oxide, germanium oxide and vanadium oxide and chemical and physical mixtures thereof are particularly preferred as the core. The $SiO_2/Al_2O_3$ particles obtained from the hydrolysis of an $SiCl_4/AlCl_3$ mixture in an oxyhydrogen flame, for example, are to be understood as a chemical mixture, while a physical mixture is, for example, a mixture of $SiO_2$ and $Al_2O_3$ particles.

The core can be present here in various modifications or mixtures of modifications of an oxide, including different physical forms. Aluminum oxide can thus be present in amorphous or crystalline form, the crystalline forms including the alpha, gamma, delta, theta and kappa modifications, as well as pyrogenic aluminum oxide, named for its preparation process, and mixtures of the abovementioned aluminum oxides. Silicon dioxide can also be present in the form of its pyrogenic oxides, or in the known modifications of silicon dioxide.

The doping component according to the invention comprises a metal or an oxide of a metal or metalloid, in each case in any desired oxidation level, from the periodic table groups I: preferably Li, Na; IA: preferably K, Rb, Cs; IB: comprising Cu, Ag, Au; II: comprising Be, Mg; IIA: comprising Ca, Sr, Ba, Ra; IIB: comprising Zn, Cd, Hg; III: comprising B, Al; IIIA: comprising Sc, Y, the lanthanides, the actinides; IIIB: comprising Ga, In, Tl; IV: preferably Si; IVA: preferably Ti, Zr, Hf; IVB: comprising Ge, Sn, Pb; VA: preferably V, Nb, Ta; VB: comprising As, Sb, Bi; VIA: preferably Cr, Mo, W; VIB: preferably Se, Te; VIIA: preferably Mn, Tc, Re; VIII: preferably Fe, Co, Ni, Ru, Rh, Pd, Os, Ir, Pt. The doped noble metals (Au, Ag, Re, Ru, Rh, Pd, Os, Ir, Pt) are as a rule present in elemental form or also have oxidic surface regions.

The oxides of the metals and metalloids of K, Mg, Al, Si, Ti, V, Cr, Mn, Fe, Co, Ni, Cu, Sn, Zn, W, La, Ce and Zr are particularly preferred as the doping component.

The doping component can be varied within wide limits, 1 ppm and 30 wt. %, based on the core. A range between 300 ppm and 10 wt. % is preferred.

The shell according to the invention comprises a metal or an oxide of a metal or metalloid, in each case in any desired oxidation level, from the periodic table groups I: preferably Li, Na; IA: preferably K, Rb, Cs; IB: comprising Cu, Ag, Au; II: comprising Be, Mg; IIA: comprising Ca, Sr, Ba, Ra; IIB: comprising Zn, Cd, Hg; III: comprising B, Al; IIIA: comprising Sc, Y, the lanthanides, the actinides; IIIB: comprising Ga, In, Tl; IV: preferably Si; IVA: preferably Ti, Zr, Hf; IVB: comprising Ge, Sn, Pb; VA: preferably V, Nb, Ta; VB: comprising As, Sb, Bi; VIA: preferably Cr, Mo, W; VIB: preferably Se, Te; VIIA: preferably Mn, Tc, Re; VIII: preferably Fe, Co, Ni, Ru, Rh, Pd, Os, Ir, Pt. The doped noble metals (Au, Ag, Re, Ru, Rh, Pd, Os, Ir, Pt) are as a rule present in elemental form or also have oxidic surface regions.

The oxides of cerium, zirconium, aluminum, silicon, titanium, iron, tin, zinc, germanium and vanadium are particularly preferred as the shell.

The shell oxides can be present on the doped core in amorphous and/or crystalline form, and can completely or partly envelop the core.

Like the doping component, the shell oxides can also be varied within wide limits, 10 ppm and 65 wt. %, based on the doped core. A range between 5 and 40 wt. % is preferred.

The BET surface area of the enveloped and doped metal oxide or metalloid oxide can be between 5 and 1000 $m^2/g$, and the average primary particle size can be between 1 nm and 1 $\mu$m.

The invention also provides a process for the preparation of the coated, doped metal oxides and metalloid oxides.

The preparation is preferably carried out in a two-stage process, the doping of the metal oxide or metalloid oxide taking place in a first process step and the doped core being enveloped in a second process step.

For doping of the core, an aerosol which comprises, as a precursor of the doping component, a metal compound or metalloid compound, dissolved, or suspended in a solution, is fed into a flame such as is used for the preparation of pyrogenic oxides. This aerosol is mixed homogeneously, before the reaction, with a gas mixture, which comprises a precursor of the core, an oxygen containing gas and a flammable gas, such as hydrogen or propane, the aerosol gas is allowed to react in a flame, and the doped core formed is separated off from the gas stream in a known manner.

The compounds of the metalloids/metals aluminum, titanium, zirconium and silicon which are converted into the oxides under the reaction conditions are preferably employed as precursors of the core. Metal halides, such as, for example, aluminum chloride, titanium tetrachloride and silicon tetrachloride, are particularly preferred.

Metals and/or metalloids and compounds thereof, as long as they are soluble or can be suspended in a liquid solution, can be employed as a precursor of the doping component. These are converted into the oxides under the reaction conditions. The noble metals (Au, Ag, Re, Ru, Rh, Pd, Os, Ir, Pt) are as a rule present in elemental form or also have oxidic surface regions. Salts of the metal compounds and metalloid compounds of the periodic table groups I: preferably Li, Na; IA: preferably K, Rb, Cs; IB: comprising Cu, Ag, Au; II: comprising Be, Mg; IIA: comprising Ca, Sr, Ba, Ra; IIB: comprising Zn, Cd, Hg; III: comprising B, Al; IIIA: comprising Sc, Y, the lanthanides, the actinides; IIIB: comprising Ga, In, Tl; IV: preferably Si; IVA: preferably Ti, Zr, Hf; IVB: comprising Ge, Sn, Pb; VA: preferably V, Nb, Ta; VB: comprising As, Sb, Bi; VIA: preferably Cr, Mo, W; VIB: preferably Se, Te; VIIA: preferably Mn, Tc, Re; VIII: preferably Fe, Co, Ni, Ru, Rh, Pd, Os, Ir, Pt, in each case in the various oxidation levels, are preferred.

Particularly preferably are metal salts or metalloid salts of K, Mg, Al, Si, Ti, V, Cr, Ce, Mn, Fe, Co, Ni, Cu, Zn, Sn, W, La, Y, Zr in the various oxidation levels.

In the second process step, the shell is added to the doped core. In this step, a solution or suspension which comprises 0.001–75 wt. %, based on the doped core, of a metal salt or metalloid salt is added to an aqueous and/or alcoholic dispersion which comprises 1–60 wt. %, based on the dispersion, of a doped metal oxide or metalloid oxide prepared in the first process step. The reaction mixture is dried and optionally calcined. Under the reaction conditions, the oxides, with the exception of the noble metal compounds, are converted into the corresponding oxides.

The second process step can furthermore be carried out by a procedure in which a doped core is sprayed, in a suitable mixing vessel with mixing, preferably intensive mixing, optionally first with an aqueous liquid and then with an aqueous solution or dispersion of a metal salt or metalloid salt, the components are optionally after-mixed and the mixture is heated at a temperature of 100 to 900° C. over a period of 1 min to 8 hours.

Salts of the metal compounds and metalloid compounds of the periodic table groups I: preferably Li, Na; IA: preferably K, Rb, Cs; IB: comprising Cu, Ag, Au; II: comprising Be, Mg; IIA: comprising Ca, Sr, Ba, Ra; IIB: comprising Zn, Cd, Hg; III: comprising B, Al; IIIA: comprising Sc, Y, the lanthanides, the actinides; IIIB: comprising Ga, In, Tl; IV: preferably Si; IVA: preferably Ti, Zr, Hf; IVB: comprising Ge, Sn, Pb; VA: preferably V, Nb, Ta; VB: comprising As, Sb, Bi; VIA: preferably Cr, Mo, W; VIB: preferably Se, Te; VIIA: preferably Mn, Tc, Re; VIII: preferably Fe, Co, Ni, Ru, Rh, Pd, Os, Ir, Pt, in each case in the various oxidation levels, are preferred. The noble metals (Au, Ag, Re, Ru, Rh, Pd, Os, Ir, Pt) are as a rule present in elemental form or also have oxidic surface regions.

The doped oxide particles enveloped according to the invention are used as polishing agents in the chemical-mechanical polishing of semiconductor substrates and of layers applied to them.

By the invention, it is possible to supplement the abrasive particle core modified by the doping with a further component, which is on the surface of the doped particle and thus completely available during polishing. Due to the diversity of the possible combinations during simple preparation, it is thus possible to obtain a particle tailor-made to the particular polishing task.

The enveloped doped oxide particles of the invention can furthermore be used, for example, as a filler, for adjusting the rheology of liquid systems, as a carrier material, as a catalytically active substance, as a starting material for the preparation of dispersions, as a ceramic base substance, in the electronics industry, in the cosmetics industry, as an absorber material, as an additive in the silicone and rubber industry, for heat stabilization, as a thermal insulation material, as a flow auxiliary, as a filler in the dental industry, as an auxiliary in the pharmaceuticals industry, in the paint industry, in PET film uses, in toner powders, as a rustproofing agent, in inks, and in battery separators.

Having generally described this invention, a further understanding can be obtained by reference to certain specific examples which are provided herein for purposes of illustration only and are not intended to be limiting unless otherwise specified.

The Examples A describe the doping of silicon dioxide, the Examples B describe the coating of doped silicon dioxides with cerium oxide. Analytical values of the samples are to be found in the table.

EXAMPLE A-1

Aluminum Oxide-doped Silicon Dioxide 5.25 kg/h $SiCl_4$ are vaporized at approx. 130° C. and transferred into the central pipe of the burner. 3.47 $Nm^3/h$ (primary hydrogen) and 3.76 $Nm^3/h$ air are additionally fed into the central pipe. The gas mixture flows out of the inner nozzle of the burner and burns in the burner chamber and the water-cooled flame pipe connected thereto. To avoid caking on the nozzles, 0.5 $Nm^3/h$ (sleeve or secondary) hydrogen is fed into the sleeve nozzle surrounding the central nozzle. 20 $Nm^3/h$ (secondary) air are also additionally fed into the burner chamber.

The second gas component flows out of the axial pipe into the central pipe. The second gas stream comprises an aerosol loaded with an aluminum salt. This aluminum salt aerosol is generated by atomization from a 2.3% aqueous aluminum (III) chloride solution in the aerosol generator. 460 g/h aluminum salt solution are atomized. This atomized aluminum salt solution is passed with the aid of a carrier gas of 0.5 $Nm^3/h$ air through heated lines, the salt vapour mist being converted into a gas and a salt crystal aerosol at temperatures of approx. 180° C. The temperature of the gas mixture ($SiCl_4$-air-hydrogen, aerosol) is measured at the burner mouth; it is 180° C.

After the flame hydrolysis the reaction gases and the pyrogenic silica, doped with aluminum, formed are sucked through a cooling system by applying a reduced pressure, and the particle-gas stream is thereby cooled to approx. 100 to 160° C. The solid is separated off from the waste gas stream in a filter or cyclone.

The aluminum oxide-doped silicon dioxide is obtained as a white finely divided powder. In a further step, still adhering hydrochloric acid residues are removed from the silica by treatment with air containing steam at elevated temperature.

EXAMPLE A-2

Manganese Oxide-doped Silicon Dioxide 3.25 kg/h $SiCl_4$ are vaporized at approx. 130° C. and transferred into the central pipe of the burner of Example A-1. 3.25 $Nm^3/h$ (primary hydrogen) and 5.0 $Nm^3/h$ air are additionally fed into the central pipe. The gas mixture flows out of the inner nozzle of the burner and burns in the burner chamber and the water-cooled flame pipe connected thereto.

To avoid caking on the nozzles, 0.3 $Nm^3/h$ (sleeve or secondary) hydrogen is fed into the sleeve nozzle surrounding the central nozzle. The second gas component flows out of the axial pipe into the central pipe. The second gas stream comprises an aerosol loaded with a manganese salt. This manganese salt aerosol is generated by atomization from a 20% aqueous manganese(II) chloride solution in the aerosol generator. 225 g/h manganese salt solution are atomized. This atomized manganese salt solution is passed with the aid of a carrier gas of 0.5 $Nm^3/h$ air through heated lines, the salt vapour mist being converted into a gas and a salt crystal aerosol at temperatures of approx. 180° C. The temperature of the gas mixture ($SiCl_4$-air-hydrogen, aerosol) is measured at the burner mouth; it is 180° C. After the flame hydrolysis the reaction gases and the pyrogenic silica, doped with manganese, formed are sucked through a cooling system by applying a reduced pressure, and the particle-gas stream is thereby cooled to approx. 100 to 160° C. The solid is separated off from the waste gas stream in a filter or cyclone. The manganese oxide-doped silicon dioxide is obtained as a white finely divided powder. In a further step, still adhering hydrochloric acid residues are removed from the silica by treatment with air containing steam at elevated temperature.

EXAMPLE B-1

300 g pyrogenic silica doped with $MnO_2$ are dispersed in a solution of 250 g cerium nitrate ($Ce(NO_3)_3$) in 10 l water. The water is allowed to dry up at 90° C. A heat treatment is then carried out at 500° C. for 3 h.

EXAMPLE B-2

300 g pyrogenic silica doped with $MnO_2$ are dispersed in a solution of 500 g cerium nitrate ($Ce(NO_3)_3$) in 10 l water. The water is allowed to dry up at 90° C. A heat treatment is then carried out at 500° C. for 3 h.

EXAMPLE B-3

300 g pyrogenic silica doped with $MnO_2$ are dispersed in a solution of 1.2 kg cerium nitrate ($Ce(NO_3)_3$) in 10 l water. The water is allowed to dry up at 90° C. A heat treatment is then carried out at 500° C. for 3 h.

EXAMPLE B-4

300 g pyrogenic silica doped with $Al_2O_3$ are dispersed in a solution of 250 g cerium chloride ($CeCl_3$) in 10 l water. The water is allowed to dry up at 90° C. A heat treatment is then carried out at 500° C. for 3 h.

EXAMPLE B-5

300 g pyrogenic silica doped with $Al_2O_3$ are dispersed in a solution of 250 g cerium acetate ($Ce(O_2C_2H_3)_3$) in 10 l water. The water is allowed to dry up at 90° C. A heat treatment is then carried out at 500° C. for 3 h.

EXAMPLE B-6

300 g pyrogenic silica doped with $MnO_2$ are dispersed in a solution of 250 g cerium nitrate ($Ce(NO_3)_3$) in 10 l water. The water is allowed to dry up at 90° C. A heat treatment is then carried out at 300° C. for 3 h.

EXAMPLE B-7

300 g pyrogenic silica doped with $MnO_2$ are dispersed in a solution of 250 g cerium nitrate ($Ce(NO_3)_3$) in 10 l water. The water is allowed to dry up at 90° C. A heat treatment is then carried out at 400° C. for 3 h.

EXAMPLE B-8

300 g pyrogenic silica doped with $MnO_2$ are dispersed in a solution of 250 g cerium nitrate ($Ce(NO_3)_3$) in 10 l water. The water is allowed to dry up at 90° C. A heat treatment is then carried out at 600° C. for 3 h.

EXAMPLE B-9

300 g pyrogenic silica doped with $MnO_2$ are dispersed in a solution of 250 g cerium nitrate ($Ce(NO_3)_3$) in 2.5 l water. The water is allowed to dry up at 90° C. A heat treatment is then carried out at 500° C. for 3 h.

TABLE

Analytical data of the samples obtained according to Examples B-1 to B-9

| Sample | SiO$_2$ [wt. %] | CeO$_2$ [wt. %] | Doping component [wt. %] | BET surface area [m$^2$/g] | Loss on drying [wt. %] | Loss on ignition [wt. %] |
| --- | --- | --- | --- | --- | --- | --- |
| A-1 | 99.8 | 0 | 0.2 | 80 | 0.93 | 0.98 |
| A-2 | 99.0 | 0 | 1.0 | 81 | 1.10 | 1.01 |
| B-1 | 80 | 19.5 | 0.5 | 76 | 1.25 | 0.76 |
| B-2 | 53.8 | 45.7 | 0.5 | 76 | 1.05 | 1.18 |
| B-3 | 34.9 | 64.6 | 0.5 | 78 | 1.75 | 1.4 |
| B-4 | 78.1 | 21.6 | 0.3 | 73 | 1.03 | 1.21 |
| B-5 | 67.6 | 32.1 | 0.3 | 80 | 1.25 | 0.98 |
| B-6 | 80.3 | 19.2 | 0.5 | 81 | 1.36 | 1.01 |
| B-7 | 81 | 18.5 | 0.5 | 77 | 1.41 | 0.96 |
| B-8 | 79.8 | 19.7 | 0.5 | 78 | 1.12 | 1.11 |
| B-9 | 69.3 | 15.3 | 15.4 | 70 | 1.19 | 1.08 |

Loss on drying (2 h at 105° C., by the method of DIN/ISO 787/II, ASTM D 280, JIS K 5101/21);

Loss on ignition (2 h at 1000° C., by the method of DIN 55921, ASTM D 1208, JIS K 5101/23, based on the substance dried at 105° C. for 2 h)

Figure 1B:
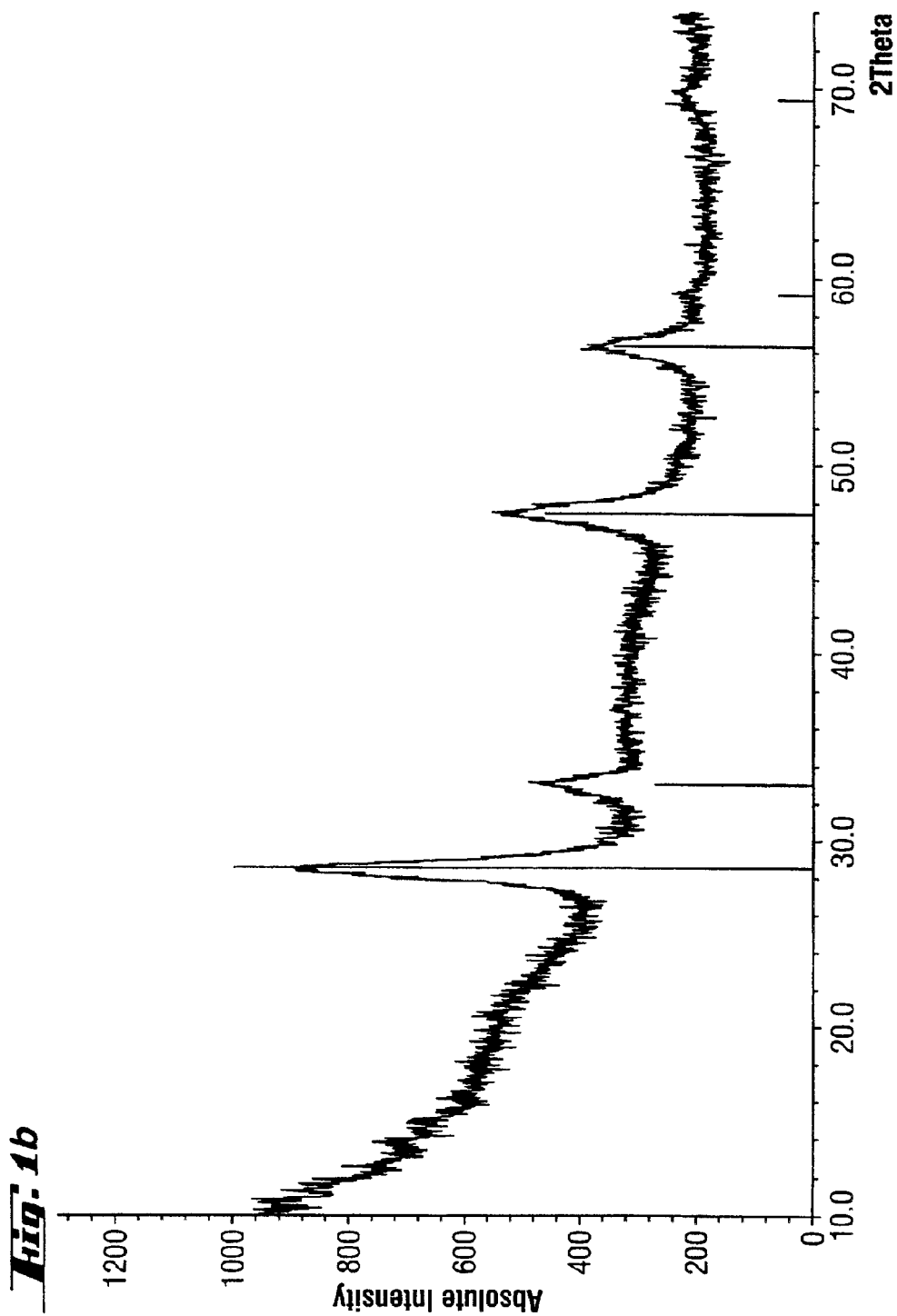
FIG. 1b is an X-ray diffractogram of the FIG. 1a example.

FIG. 1*a* shows a TEM photograph, FIG. 1*b* the associated X-ray diffractogram of the doped cerium oxide of the particles prepared according to Example B-2.

Figure 2A:
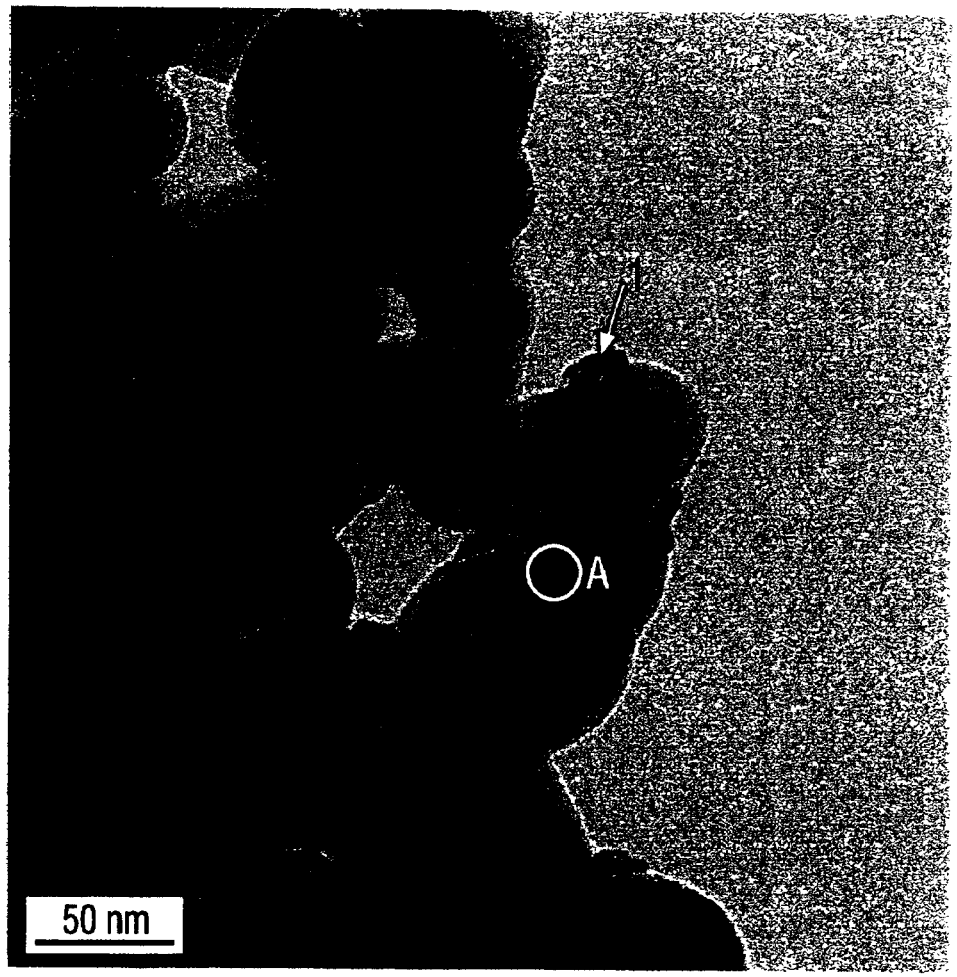
Figure 2B:
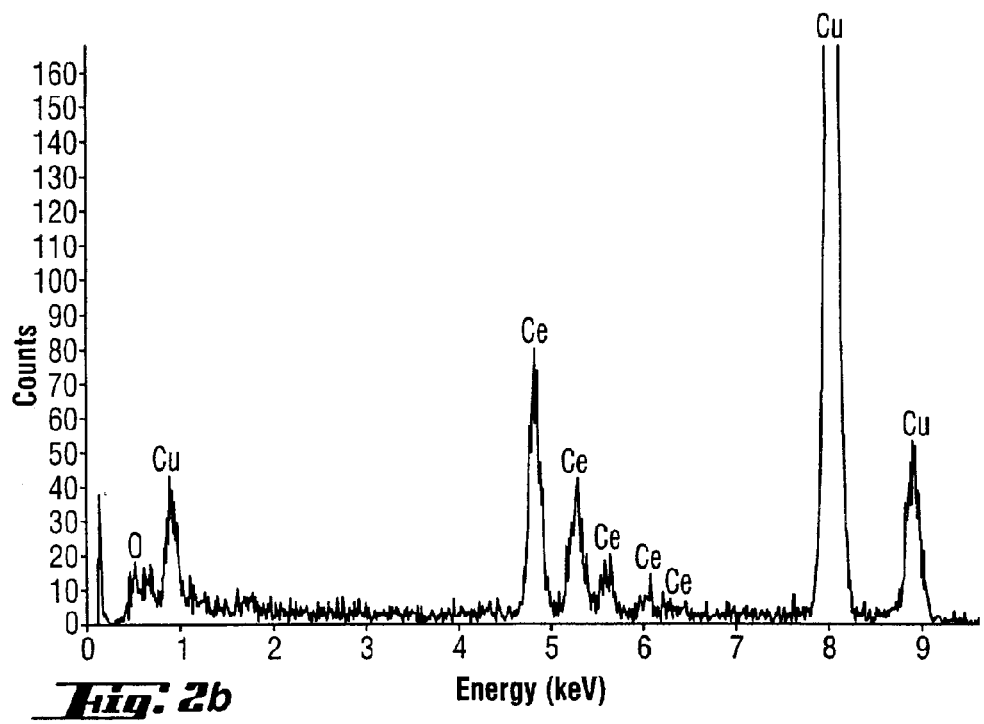
FIGS. 2b, and 2c are EDX spectra of the FIG. 2a example.
Figure 2C:
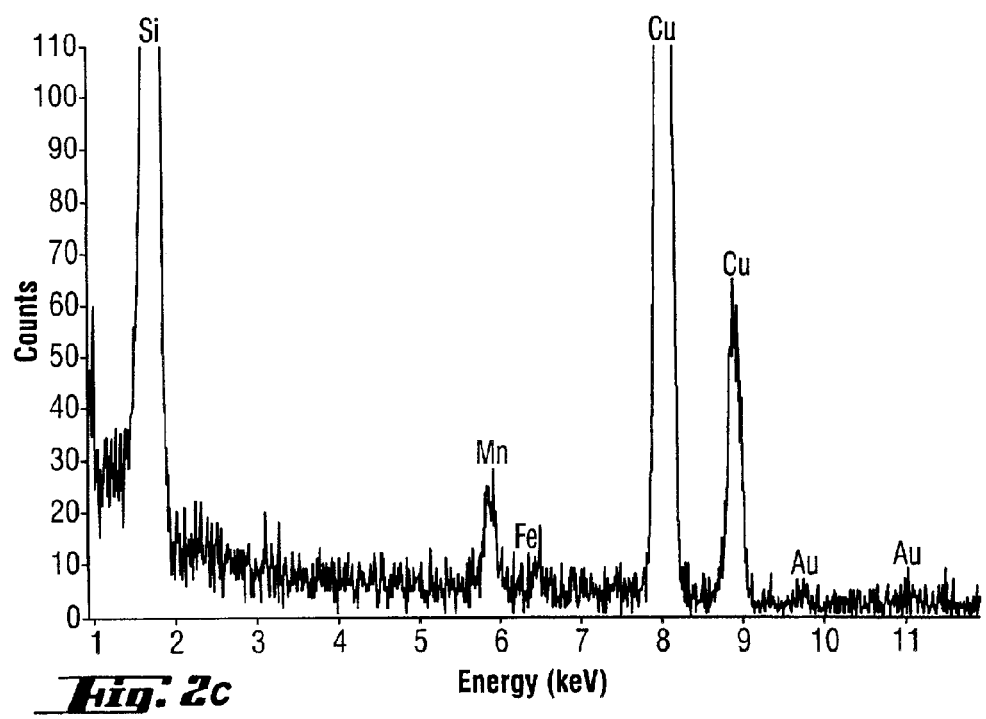

FIG. 2*a* shows a TEM photograph of the particles from Example B-1 with the regions A (doping) and 1 (coating). Manganese oxide (doping component, region A) and cerium oxide (coating) are clearly to be seen. The EDX spectrum of region 1 (FIG. 2*b*) shows cerium oxide as a coating component, region A (FIG. 2*c*) shows manganese oxide as a doping component.

The disclosure of priority application, European patent application 01 107 334.3, filed Mar. 24, 2001, is hereby incorporated by reference.

What is claimed is:

1. Oxide particles comprising an oxide core, an oxide doping component distributed in the core, thus forming a doped core, and an oxide shell surrounding the doped core, wherein the core, the doping component and the shell are different phases each having a different chemical composition.

2. Oxide particles according to claim 1, wherein the oxide core is a metal oxide or metalloid oxide, or a chemical or physical mixture of at least two metal oxides or metalloid oxides, which is inclusive of said mixtures of metal oxides and metalloid oxides.

3. Oxide particles according to claim 2, wherein the metal oxide or metalloid oxide is obtained by a process selected from the group consisting of pyrogenic, sol-gel, hydrothermal, plasma, aerogel and precipitation, process.

4. Oxide particles according to claim 3, wherein the metal oxides or metalloid oxides are obtained by a pyrogenic process, and are selected from the group consisting of aluminum oxide, titanium oxide, zirconium oxide, silicon oxide, iron oxide, cerium oxide, tin oxide, zinc oxide, germanium oxide and vanadium oxide.

5. Oxide particles according to claim 2, wherein the oxide core comprises a mixture of different physical forms of metal oxides or metalloid oxides.

6. Oxide particles according to claim 1, wherein the oxide doping component comprises at least one oxide of a metal or metalloid from the periodic table groups I, IA, IB, II, IIA, IIB, III, IIIA, IIIB, IV, IVA, IVB, VA, VB, VIA, VIB, VIIA or VIII, in each case in any oxidation level.

7. Oxide particles according to claim 6, wherein the oxide doping component comprises at least one oxide of the metals or metalloid selected from the group consisting of K, Mg, Al, Si, Ti, V, Cr, Mn, Fe, Co, Ni, Cu, Sn, Z , W, La, Ce, and Zr.

8. Oxide particles according to claim 1, wherein the content of the doping component is between 1 ppm and 30 wt. %, based on the core.

9. Oxide particles according to claim 1, wherein the oxide shell comprises at least one oxide of a metal or metalloid from the periodic table groups I, IA, IB, II, IIA, IIB, III, IIIA, IIIB, IV, IVA, IVB, VA, VB, VIA, VIB, VIIA or VIII, in each case in any oxidation level.

10. Oxide particles according to claim 9, wherein the oxide shell comprises at least one oxide of the metals or metalloids selected from the group consisting cerium, zirconium, aluminum, silicon, titanium, iron, tin, zinc, germanium and vanadium.

11. Oxide particles according to claim 1, wherein th shell is present in at least one of amorphous and crystalline form on the doped core.

12. Oxide particles according to claim 1, wherein the shell completely or partly encloses the doped core.

13. Oxide particles according to claim 1, wherein the content of the shell is between 10 ppm and 65 wt. %, based on the doped core.

14. Oxide particles according to claim 1, wherein the BET surface area thereof is between 5 and 1000 m$^2$/g.

15. Oxide particles according to claim 1, wherein the average primary particle size thereof is between 1 nm and 1 μm.

16. Process for the preparation of the oxide particles according to claim 1, comprising carrying out doping of the core and then coating the doped core with the shell.

17. Process according to claim 16, wherein doping of core is carried out by homogeneously mixing (1) an aerosol which comprises as a precursor for the doping component, a metal compound or metalloid compound, dissolved, or suspended in a solution, and (2) a gas which comprises a precursor of the core component, an oxygen containing gas and a flammable gas, to form an aerosol-gas mixture;

subjecting the aerosol-gas mixture to flame hydrolysis, thereby forming said doped core.

18. Process according to claim 16, wherein coating of the doped core is carried out by adding a solution or suspension which comprises 0.001–75 wt. %, based on the doped core, of a metal salt or metalloid salt, as a precursor of the shell, to an aqueous and/or alcoholic dispersion which comprises 1–60 wt. %, based on the dispersion, of the doped core, to form a reaction mixture, drying the mixture, and optionally calcining the mixture, whereby the precursor of the shell reacts to form said shell surrounding the doped core.

19. Process according to claim 16, wherein coating of the doped core is carried out by spraying the doped core in a mixing vessel with mixing, optionally first with an aqueous liquid and then with an aqueous solution or dispersion of a metal salt or metalloid salt, as a precursor of the shell, to form a reaction mixture, optionally further mixing the reaction mixture, and heating at a temperature of 100 to 900° C. over a period of 1 min to 8 hours, whereby the precursor of the shell reacts to form said shell surrounding the doped core.

20. A method comprising chemical-mechanical polishing of a semiconductor substrate or of a layer applied thereto with oxide particles comprising a core, a doping component distributed in the core, thus forming a doped core, and a shell surrounding the doped core, wherein the core, the doping component and the shell each have a different chemical composition.

21. Oxide particles, comprising a shell covering aggregates of doped core particles, wherein each doped core particle comprises a core, and a doping component distributed in the core; and the core, the doping component and the shell each have a different chemical composition.

* * * * *